US006876918B2

(12) United States Patent
Kabe et al.

(10) Patent No.: US 6,876,918 B2
(45) Date of Patent: Apr. 5, 2005

(54) METHOD AND APPARATUS FOR ESTIMATING ENGINE TORQUE

(75) Inventors: Tomoaki Kabe, Aichi (JP); Masahiro Hamano, Aichi (JP); Katsutoshi Usuki, Aichi (JP); Tetsuya Fujioka, Aichi (JP)

(73) Assignee: JATCO Ltd, Fuji (JP)

( * ) Notice: Subject to any disclaimer, the term of this patent is extended or adjusted under 35 U.S.C. 154(b) by 16 days.

(21) Appl. No.: 10/662,885

(22) Filed: Sep. 16, 2003

(65) Prior Publication Data

US 2004/0128049 A1 Jul. 1, 2004

(30) Foreign Application Priority Data

Sep. 19, 2002 (JP) ...................................... 2002-273696

(51) Int. Cl.[7] ........................... B60K 4/04; F02D 41/12

(52) U.S. Cl. .......................... 701/110; 701/54; 123/325

(58) Field of Search .................. 701/110, 54; 123/325, 123/480; 477/62, 154

(56) References Cited

U.S. PATENT DOCUMENTS 4,508,075 A * 4/1985 Takao et al. ................ 123/480
5,662,549 A * 9/1997 Kondo et al. ............... 477/154
5,934,879 A * 8/1999 Konno et al. ................. 417/15
6,009,988 A * 1/2000 Saito et al. .................... 477/62

FOREIGN PATENT DOCUMENTS

JP 2-118260 A * 5/1990 .......... F16H/61/00
JP 4-236852 A 8/1992
JP 9-100902 A * 4/1997 .......... F16H/61/02

* cited by examiner

*Primary Examiner*—Hieu T. Vo
(74) *Attorney, Agent, or Firm*—Foley & Lardner LLP

(57) ABSTRACT

An engine torque estimating apparatus is connected to an automatic transmission and an internal combustion engine. A control unit of the engine torque estimating apparatus is arranged to stop a fuel supply to the engine when a predetermined engine operating condition is satisfied, to estimate a torque generated by the engine using a first map which has defined the torque according to an engine speed and an intake air flow of the engine when the fuel supply to the engine is executed, and to estimate the torque using a second map which has defined the torque according to the engine speed when the fuel supply to the engine is stopped.

13 Claims, 3 Drawing Sheets

METHOD AND APPARATUS FOR ESTIMATING ENGINE TORQUE

BACKGROUND OF THE INVENTION

The invention relates to a method and apparatus of estimating an output torque generated by an internal combustion engine.

There have been proposed various engine torque estimating methods such as a method of calculating an engine output torque on the basis of an intake air flow information A/N, and another method of measuring a pressure and a volume in a cylinder of an internal combustion engine, of providing a pressure-volume relation map by each cycle of the engine, and of calculating an engine output torque therefrom as disclosed in Japanese Patent Provisional Publication No. 4-236852. In the former method, intake air flow information A/N is an engine intake air quantity per one rotation of the engine, since A is an intake air flow rate per unit time and N is an engine speed. That is, A/N is treated as engine load information.

SUMMARY OF THE INVENTION

However, the former method has a limitation that an estimation accuracy of an engine output torque is degraded under a predetermined condition such as a fuel supply stopped condition. Further, the latter method requires to be equipped with a pressure sensor for detecting a pressure in an engine cylinder. This increases parts count of the system and tends to increase a production cost thereby. Further, since the system employing the latter method is required to have a fail-safe system for the pressure sensor, such a system with the pressure sensor becomes high in cost and increases production steps thereof.

Generally, a fuel cut at an engine is executed when a predetermined condition such as an accelerator fully closed state is satisfied. When such a fuel cut is executed, a relationship between intake air flow A/N and an engine output torque becomes unstable, and consequently the accuracy of the estimated engine torque is largely lowered if the engine output torque is estimated using the intake air flow A/N as a parameter.

Further, when the fuel cut is executed, there is commonly executed a control for suppressing a radical increase of a negative pressure in a cylinder by forcibly and slightly opening a throttle valve. Under this condition, the relationship between the intake air flow A/N and the engine output torque particularly becomes unstable, and therefore it is difficult to accurately estimate the engine output torque.

It is therefore an object of the present invention to provide a method and apparatus of estimating an engine output torque, which method and apparatus is capable of accurately and easily estimating the engine output torque even during the fuel cut executing period without complicating a structure of the apparatus.

An aspect of the present invention resides in an engine torque estimating apparatus which comprises fuel supply stopping means for stopping fuel supply to an internal combustion engine when a predetermined engine operating condition is satisfied; and engine torque estimating means for estimating a torque generated by the engine. The engine torque estimating means comprises a first engine torque estimating section for estimating the torque generated by the engine when the fuel supply stopping means is in an inoperative state, and a second engine torque estimating section for estimating the torque generated by the engine when the fuel supply stopping means is in an operative state.

A further aspect of the present invention resides in a method of estimating a torque generated by an internal combustion engine, which comprises a step of determining whether fuel supply to the engine is executed, and a step of estimating an engine torque generated by the engine on the basis of a second engine torque map for defining the engine torque according to an engine speed of the engine when the fuel supply is not executed.

Another aspect of the present invention resides in an engine torque estimating apparatus connected to an automatic transmission and an internal combustion engine. The engine torque estimating apparatus comprises a control unit which is arranged to stop a fuel supply to the engine when a predetermined engine operating condition is satisfied, to estimate a torque generated by the engine using a first map which has defined the torque according to an engine speed and an intake air flow of the engine when the fuel supply to the engine is executed, and to estimate the torque using a second map which has defined the torque according to the engine speed when the fuel supply to the engine is stopped.

The other objects and features of this invention will become understood from the following description with reference to the accompanying drawings.

DETAILED DESCRIPTION OF THE INVENTION

Referring to FIGS. 1 through 4, there is discussed an embodiment of an engine torque estimating method and apparatus in accordance with the present invention.

Figure 1:
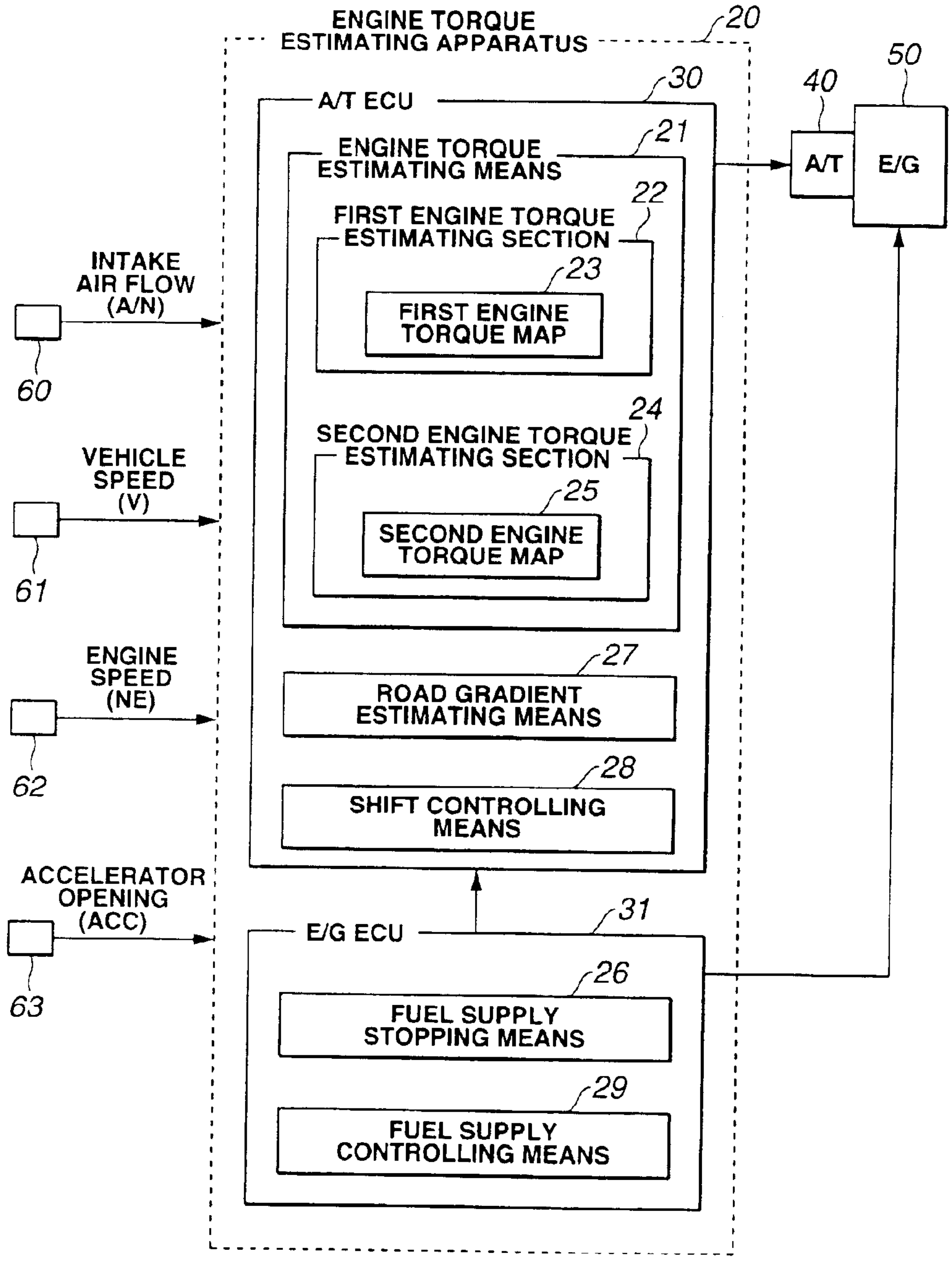
FIG. 1 is a block diagram showing an engine torque estimating apparatus according to an embodiment of the present invention.

As shown in FIG. 1, an internal combustion engine (E/G) 50 for a vehicle is equipped with an automatic transmission (A/T) 40. An engine torque estimating apparatus 20 is connected to E/G 50 and A/T 40. Engine torque estimating apparatus 20 comprises an automatic transmission control unit (A/T-ECU) 30 for controlling A/T 40 and an engine control unit (E/G-ECU) 31 for controlling E/G 50 which are cooperated with each other so as to achieve a function of engine torque estimating apparatus 20. Engine torque estimating apparatus 20 is connected to an air flow sensor 60, a vehicle speed sensor 61, an engine speed sensor 62 and an accelerator sensor 63 so as to receive information of the vehicle therefrom. More specifically, Engine torque estimating apparatus 20 receives an intake air flow A/N indicative signal from air flow sensor 60, a vehicle speed V indicative signal from vehicle speed sensor 61, an engine speed NE indicative signal from engine speed sensor 62 and an accelerator opening ACC indicative signal from accelerator sensor 63.

A/T-ECU 30 comprises engine torque estimating means 21, road gradient estimating means 27 and shift controlling means 28 which are constructed in the form of software in this embodiment. These means 21, 27 and 28 may be constructed by logic circuits, respectively, Engine-torque estimating means 21 is arranged to estimate an output engine torque generated by E/G 50, and comprises first engine torque estimating section 22 and second engine torque estimating section 24.

Figure 2:
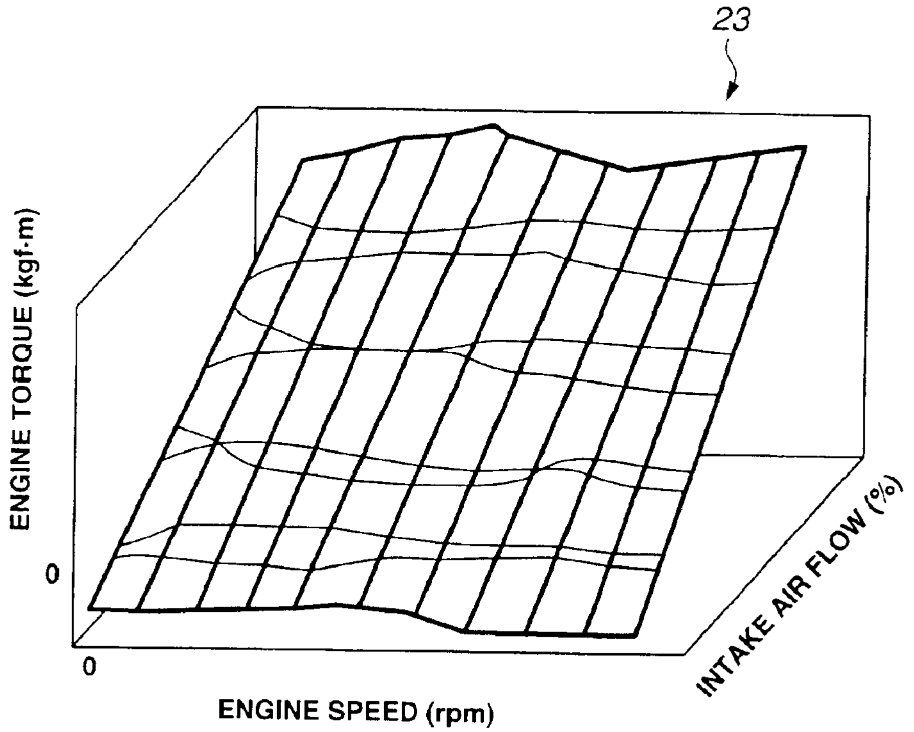
FIG. 2 is a graph showing a first engine torque map for the engine torque estimating apparatus of FIG. 1.

First engine torque estimating section 22 is put in an operative state when fuel supply stopping means 26 is put in an inoperative state, that is, when the engine torque takes a positive value. First engine torque estimating section 22 estimates and calculates the output torque of E/G 50 using a first engine torque map 23 stored in first engine torque estimating section 22. More specifically, first engine torque estimating section 22 estimates the engine output torque on the basis of an engine speed NE detected by engine speed sensor 62 and intake air flow indicative information A/N obtained from air flow sensor 60 and using first engine torque map 23. FIG. 2 shows first engine torque map 23 which is a three-dimensional map constructed by engine speed NE, intake air flow information A/N and the engine torque.

On the other hand, second engine torque estimating section 24 shown in FIG. 1 is put in an operative state when fuel supply stopping means 26 is put in operative state, that is, when the engine torque takes a negative value. Second engine torque estimating section 24 estimates an actual engine output torque generated by E/G 50 in operation using a second engine torque map 25 stored in second engine torque estimating section 24. More specifically, second engine torque estimating section 24 calculates an estimated engine output torque on the basis of engine speed NE detected by engine speed sensor 62 and using second engine torque map 25 wherein the negative engine torque is set according to engine speed NE. When fuel supply stopping means 26 is executing a fuel cut, E/G-ECU 31 outputs a fuel cut signal indicative that the fuel cut is executed, to A/T-ECU 30. A/T-ECU 30 determines whether or not fuel supply stopping means 26 is operating, on the basis of the signal received from E/G-ECU 31, that is, whether or not the fuel supply to E/G 50 is now stopped.

Figure 3:
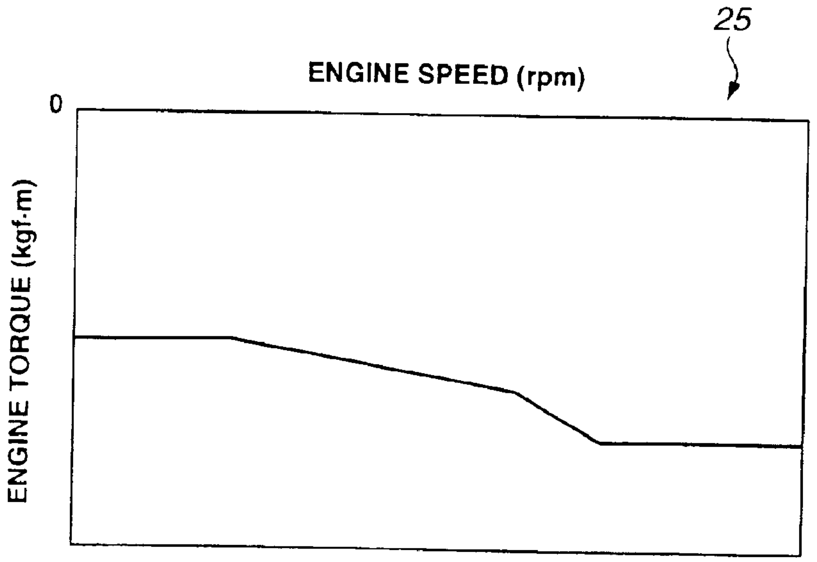
FIG. 3 is a graph showing a second engine torque map for the engine torque estimating apparatus of FIG. 1.

FIG. 3 shows second engine torque map 25 which is a two-dimensional map constructed by engine speed NE and the negative engine torque. This map has been prepared by measuring the negative torque of E/G 50 by each engine speed NE. The negative engine torque generally corresponds to a pumping loss of E/G 50. That is, second engine torque map 25 has been prepared by applying a torque to a drive shaft of E/G 50 externally under a condition no fuel is supplied to E/G 50, and by recording the inputted torque at predetermined engine speed intervals such as at 100 rpm intervals. Although the torque inputted from outside to E/G 50 corresponds to the sum of a pumping loss of E/G 50 and a friction loss generated between engine constructing parts such as a piston and a cylinder, the negative engine torque practically corresponds to the pumping loss. Further, although second engine torque map 20 is stored as an aggregation of discrete values, the map shown in FIG. 3 is represented by a continuous value which is obtained by compensating the discrete data.

Road gradient estimating means 27 estimates and calculates a gradient of a road on which a vehicle is actually traveling, on the basis of the estimate engine output torque. Shift controlling means 28 determines a gear ratio of A/T 40 on the basis of the road gradient, vehicle speed V, engine speed NE and accelerator opening ACC and controls the shift condition of A/T 40.

E/G-ECU 31 comprises fuel supply controlling means 29 and fuel supply stopping means 26 which are constructed in the from of software in this embodiment. These means 29 and 26 may be constructed by logic circuits, respectively.

Fuel supply controlling means 29 controls a fuel injection quantity into E/G 50 by controlling fuel injectors installed in E/G 50. Fuel supply controlling means 29 is capable of executing the fuel supply control even if other fuel supplying means such as a carburetor is employed instead of the fuel injectors. When such other supplying means is employed, fuel supply controlling means 29 is adapted to the other fuel supplying means by changing the program.

Fuel supply stopping means 26 executes a fuel cut control for stopping the fuel injection executed by fuel supply controlling mean 29. When fuel supply stopping means 26 is in the operable state, the fuel supply (fuel injection) into E/G 50 is not executed. On the other hand, when fuel supply stopping means 26 is in the inoperable state, the fuel supply (fuel injection) into E/G 50 is normally executed. Although it is possible to set a condition of operating/stopping of fuel supply stopping means 26 at a desired condition, the embodiment according to the present invention is arranged to execute the fuel cut when accelerator opening is put in a full close state on the basis of accelerator opening ACC detected by accelerator pedal sensor 63, when vehicle speed V detected by vehicle speed sensor 61 is greater than or equal to a predetermined vehicle speed and when engine speed NE is greater than or equal to a predetermined engine speed. That is, when all of these three conditions are satisfied, fuel supply stopping means 26 is put in the inoperative state.

The manner of operation of the thus arranged engine torque estimating apparatus 20 according to the present invention is discussed hereinafter with reference to a flowchart shown in FIG. 4.

Figure 4:
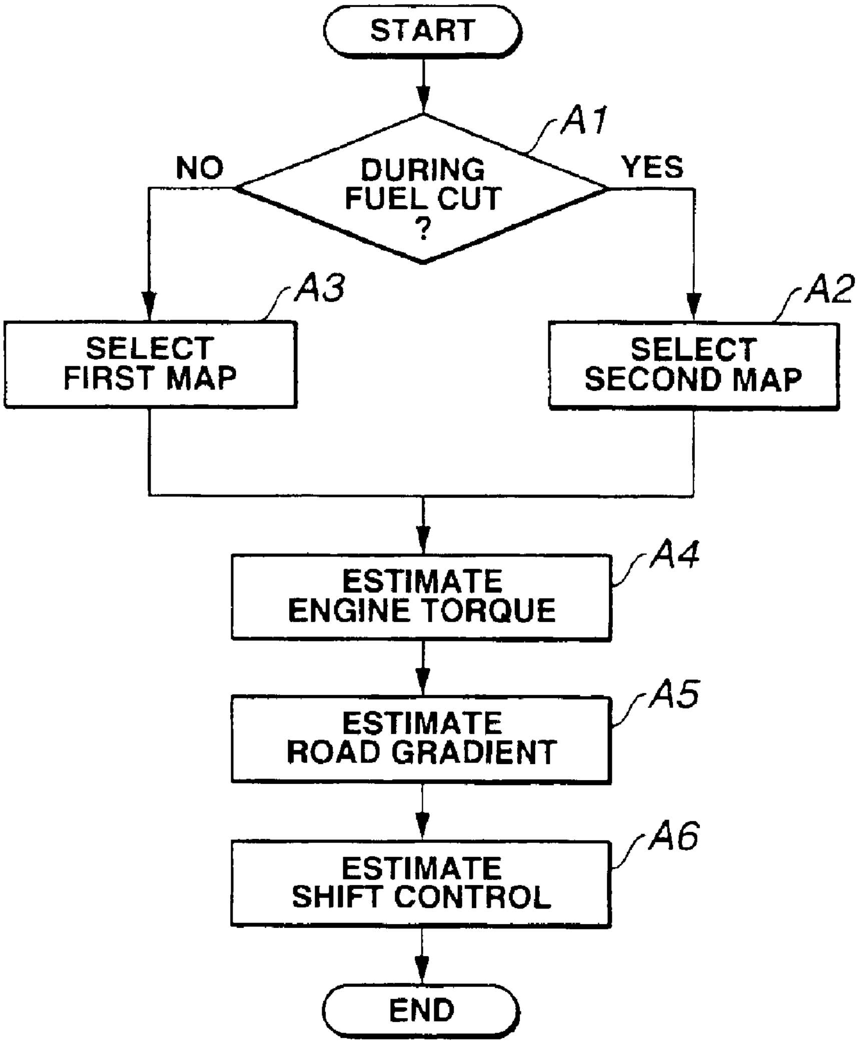
FIG. 4 is a flowchart showing a processing executed by the engine torque estimating apparatus of FIG. 1.

At step A1 in FIG. 4, it is determined whether or not the fuel cut to E/G 50 is executed. More specifically, as shown in FIG. 1 when fuel supply stopping means 26 of E/G-ECU 31 is operating, E/G-ECU 31 outputs a fuel cut indicative signal to A/T-ECU 30. A/T-ECU 30 determines that the fuel cut is executed when receiving the fuel cut indicative signal from E/G-ECU 31. On the other hand, when fuel supply stopping means 26 is not operating (is put in the inoperative state), E/G-ECU 30 does not output the fuel cut indicative signal. Since A/T-ECU 30 does not receive the fuel cut indicative signal in this condition, A/T-ECU 30 determines that the fuel supply to E/G 50 is executed.

When the determination at step A1 is negative, that is, when it is determined that the fuel cut is not executed, the program proceeds to step A3 wherein A/T-ECU 30 selects first engine torque map 23 which is the three-dimensional map wherein the engine output torque is determined according to engine speed NE and intake air flow A/N corresponding to the engine load as shown in FIG. 2. At step A4 subsequent to the execution of step A3, A/T-ECU 30 estimates the engine output torque of E/G 50 in operation on the basis of first engine torque map 23. Since first engine torque map 23 is stored in the form of the discrete data, A/T-ECU 30 obtains the engine output toque relative to engine speed NE and intake air flow A/N by executing a proper interpolation processing of the discrete data indicative of first engine torque map 23.

On the other hand, when the determination at step Al is affirmative, that is, when it is determined that the fuel cut is executed, the program proceeds to step A2 wherein A/T-ECU 30 selects second engine torque map 25 which is the two-dimensional map wherein the negative engine output torque is determined according to engine speed NE. Then, the program proceeds to step A4 wherein the engine output torque is estimated on the basis of second engine torque map 25. The negative engine torque is a torque for braking driving wheels in operation and is a factor constituting almost all of an engine brake force generated by fully closing an accelerator. Since second engine torque map 25 is also stored in the form of the discrete data, A/T-ECU 30 obtains the engine output toque relative to engine speed NE by executing a proper interpolation processing of the discrete data indicative of second engine torque map 25.

At step A5 subsequent to the execution of step A4, A/T-ECU 30 estimates and calculates the road gradient of a traveling road. At step A6 subsequent to the execution of step A5, A/T-ECU 30 selects a gear ratio upon taking account of the road gradient, that is, executes the shift control to control A/T 40 shown in FIG. 1. More specifically, after engine torque estimating means 21 of A/T-ECU 30 estimates and calculates the engine output torque, road gradient estimating means 27 of A/T-ECU 30 estimates and calculates the road gradient. Further, shift controlling means 28 of A/T-ECU 30 executes the shift control by determining the gear ratio of A/T 40. During this processing, E/G-ECU 31 is executing the fuel supply control and the fuel supply stopping control through fuel supply controlling means 29 and fuel supply stopping means 26.

With the thus described operation according to the present invention, regardless of the state of the fuel supply to E/G 50, engine torque estimating apparatus 20 is capable of accurately estimating and calculating the engine output torque generated by E/G 50 in operation. This improves the controllability of A/T 40.

Further, when the fuel is supplied to E/G 50, it is possible to accurately estimate the output torque generated by E/G 50 in operation by employing the three-dimensional first engine torque map 23 defined by engine speed NE, intake air flow (engine load) A/N and the mapped engine torque. On the other hand, when the fuel is not supplied to E/G 50, it is possible to accurately estimate the output torque generated by E/G 50 in operation by employing the two-dimensional second engine torque map 25 defined by engine speed NE and the negative engine torque corresponding to the pumping loss of E/G 50.

Further, in the event that the fuel cut is executed, even if a control of suppressing a radical increase of a negative pressure in each cylinder of E/G 50 is executed by forcibly and slightly opening the throttle valve, it is possible to accurately estimate and calculate the engine output torque regardless intake air flow A/N by employing the second engine torque map 25 defined by the negative engine torque (corresponding to the pumping loss) by each engine speed.

Furthermore, if there is employed a method of calculating the load gradient on the basis of the engine output torque calculated from intake air flow A/N and engine speed NE and of controlling the shift state (gear ratio and selected position) of the automatic transmission on the basis of the road gradient during the fuel cut condition, there is a possibility that an accuracy of the calculated engine output torque is lowered and that the accuracy of the shift state control of the automatic transmission is also lowered since the accuracy of the calculated engine output torque is not preferable. However, the engine torque estimating apparatus according to the present invention is arranged to obtain an accurate estimated engine output torque by estimating and calculating the engine output torque without further requiring additional devices such as a pressure sensor for detecting a pressure in E/G 50 and without depending on the intake air flow A/N.

Further, the apparatus according to the present invention is arranged to calculate the road gradient using the accurate estimated engine output torque and to execute a control of accurately determining the shift condition of the automatic transmission according to the calculated road gradient. Therefore, the method and apparatus according to the present invention improves a fuel consumption of the vehicle and the drive feeling of the vehicle.

Although the invention has been described above by reference to a certain embodiment of the invention, the invention is not limited to the embodiments described above. Modifications and variations of the embodiment described above will occur to those skilled in the art in light of the above teachings. For example, although engine torque estimating apparatus 20 according to the embodiment of the present invention has been shown and described such that A/T-ECU 30 and E/G-ECU 31 are independently provided, they may be constructed by one ECU so as to suppress a production cost of the apparatus by lowering the parts count and to decrease the size of the apparatus by lowering the parts count.

Further, although the embodiment according to the invention has been shown and explained as to a case of estimating and calculating the engine output torque, of estimating and calculating the road gradient using the engine output torque and of employing the engine output torque and the road gradient in the control of the automatic transmission, it will be understood that the invention is not limited to this case and may be employed in a line-pressure control of the automatic transmission or in a hydraulic pressure control of a pressure supplied to a friction element of the automatic transmission during shifting. Further, even when the invention is employed in these pressure controls, it is possible to accurately estimate and calculate the engine output torque even during the fuel cut. Therefore, it becomes possible to execute a high accuracy control of the automatic transmission.

Since the engine torque estimating apparatus according to the present invention is capable of accurately estimate the output torque generated by the engine regardless the fuel supply condition to the engine and without further employing additional parts such as a pressure sensor, the controllability of the vehicle is further improved.

Further, the engine torque estimating apparatus according to the present invention firmly and easily estimates the output torque generated by the engine in variable operation by employing the first engine torque map which is a three-dimensional map defined by the engine speed, the engine load and the estimated engine torque, when the fuel supply to the engine is executed. On the other hand, the engine torque estimating apparatus according to the present invention is capable of firmly and easily estimate the output torque generated by the engine in variable operation by employing the second engine torque map which is a simple two-dimensional engine torque map defined by the engine speed and the estimated engine torque, when the fuel supply to the engine is stopped.

Furthermore, the engine torque estimating method according to the present invention is capable of selectively employing the first and second engine torque maps, and therefore it is possible to easily and firmly estimate the output torque generated by the engine. This improves the operation controllability of the automatic transmission.

This application is based on a prior Japanese Patent Application No. 2002-273696. The entire contents of the Japanese Patent Application No. 2002-273696 with a filing date of Sep. 19, 2002 are hereby incorporated by reference. The scope of the invention is defined with reference to the following claims.

What is claimed is:

1. An engine torque estimating apparatus comprising:

fuel supply stopping means for stopping fuel supply to an internal combustion engine when a predetermined engine operating condition is satisfied; and engine torque estimating means for estimating a torque generated by the engine, the engine torque estimating means comprising, a first engine torque estimating section for estimating the torque generated by the engine when the fuel supply stopping means is in an inoperative state, and a second engine torque estimating section for estimating the torque generated by the engine when the fuel supply stopping means is in an operative state.

2. The engine torque estimating apparatus as claimed in claim 1, wherein the first engine torque estimating section comprises a first engine torque map which has set the engine torque according to the engine speed and the engine load, and the second engine torque estimating section comprises a second engine torque map which has set the engine torque according to the engine speed.

3. The engine torque estimating apparatus as claimed in claim 2, wherein the second engine torque map is a two-dimensional map which is defined by the engine speed and a negative engine torque corresponding to a pumping loss of the engine.

4. The engine torque estimating apparatus as claimed in claim 1, wherein the engine torque estimated by the second engine torque estimating section is a negative engine torque.

5. The engine torque estimating apparatus as claimed in claim 1, wherein the predetermined engine operating condition includes a condition that an accelerator opening of the engine is put in a full close state, that a vehicle speed of the vehicle equipped with the engine is greater than or equal to a predetermined vehicle speed and that an engine speed is greater than or equal to a predetermined engine speed.

6. The engine torque estimating apparatus as claimed in claim 1, further road gradient estimating means for estimating a gradient of a road, on which a vehicle equipped with the engine is traveling, from the estimated torque and shift controlling means for controlling an automatic transmission upon taking account of the gradient.

7. An engine torque estimating apparatus connected to an automatic transmission and an internal combustion engine, the engine torque estimating apparatus comprising:

a control unit arranged, to stop a fuel supply to the engine when a predetermined engine operating condition is satisfied, to estimate a torque generated by the engine using a first map which has defined the torque according to an engine speed and an intake air flow of the engine when the fuel supply to the engine is executed, and to estimate the torque using a second map which has defined the torque according to the engine speed when the fuel supply to the engine is stopped.

8. The engine torque estimating apparatus as claimed in claim 7, wherein the control unit includes an automatic transmission control unit for controlling the automatic transmission and an engine control unit for controlling the engine.

9. The engine torque estimating apparatus as claimed in claim 7, wherein the control unit is further arranged to estimate a gradient of a road, on which a vehicle equipped with the engine is traveling, from the estimated torque, and to control the automatic transmission upon taking account of the gradient.

10. The engine torque estimating apparatus as claimed in claim 7, further comprising an air flow sensor for detecting an intake air flow, a vehicle speed sensor for detecting the vehicle speed, an engine speed sensor for detecting the engine speed, and an accelerator sensor for detecting an accelerator opening, which are connected to the control unit.

11. A method of estimating a torque generated by an internal combustion engine, comprising the steps of:

determining whether fuel supply to the engine is executed; and estimating an engine torque generated by the engine on the basis of a second engine torque map which is a two-dimensional map defined by an engine speed and a negative engine torque, when the fuel supply is not executed.

12. The method as claimed in claim 11, further comprising a step of estimating the engine torque on the basis of a first engine torque map for defining the engine torque according to the engine speed and the engine load when the fuel supply to the engine is executed.

13. The method as claimed in claim 11, further comprising a step of estimating a gradient of a road, on which a vehicle equipped with the engine is traveling, from the estimated torque, and a step for controlling the automatic transmission upon taking account of the gradient.

* * * * *